(12) United States Patent
Dewar et al.

(10) Patent No.: US 9,811,602 B2
(45) Date of Patent: Nov. 7, 2017

(54) METHOD AND APPARATUS FOR DEFINING SCREEN READER FUNCTIONS WITHIN ONLINE ELECTRONIC DOCUMENTS

(75) Inventors: Amy H. Dewar, Research Triangle Park, NC (US); Nicholas E. Poore, Research Triangle Park, NC (US); Robert C. Leah, Research Triangle Park, NC (US); Peter C. Yim, Research Triangle Park, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1302 days.

(21) Appl. No.: 12/649,711

(22) Filed: Dec. 30, 2009

(65) Prior Publication Data
US 2011/0161797 A1 Jun. 30, 2011

(51) Int. Cl.
| | | |
|---|---|---|
| *G06F 17/00* | (2006.01) | |
| *G06F 17/20* | (2006.01) | |
| *G06F 17/21* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G06F 17/27* | (2006.01) | |

(Continued)

(52) U.S. Cl.
CPC .............................. *G06F 17/30896* (2013.01)

(58) Field of Classification Search
CPC .................................................. G06F 17/30896

USPC .......................... 715/234, 235, 745, 760, 765
See application file for complete search history.

(56) References Cited

U.S. PATENT DOCUMENTS 6,397,183 B1   5/2002 Baba et al.
6,665,642 B2 * 12/2003 Kanevsky et al. ............ 704/260
(Continued)

OTHER PUBLICATIONS

Seth Duffey, A More Accessible Map, Web Source: http://www.alistapart.com/articles/cssmaps, Article No. 215, Apr. 18, 2006.
(Continued)

*Primary Examiner* — Manglesh M Patel
*Assistant Examiner* — Nicholas Hasty
(74) *Attorney, Agent, or Firm* — Schmeiser, Olsen & Watts LLP

(57) ABSTRACT

A computing system for facilitating screen readers of online electronic documents includes a processor running computer readable program code configured to generate a structured electronic document including markup language code and scripting language code whose execution is triggered by an occurrence of an event associated with execution of the markup language code. Memory stores a configuration file that maps of functions of a screen reader program to functions performed by the scripting language code when the scripting language code is executed in response to the occurrence of the event. The processor executes computer readable program code configured to incorporate the configuration file within structured electronic document. On a client system, a given function of the scripting language code executes in response to the occurrence of the event, and, in response to the execution of the given function, the screen reader program performs each accessibility function mapped to the given function.

17 Claims, 3 Drawing Sheets

(51) Int. Cl.
  *G06F 17/28* (2006.01)
  *G06F 3/048* (2013.01)
  *G06F 3/00* (2006.01)
  *G06F 17/30* (2006.01)

(56) References Cited

U.S. PATENT DOCUMENTS

| | | | |
|---|---|---|---|
| 6,714,963 B1 * | 3/2004 | Levine et al. | 709/203 |
| 6,941,562 B2 | 9/2005 | Gao et al. | |
| 7,010,581 B2 * | 3/2006 | Brown et al. | 715/864 |
| 7,080,315 B1 | 7/2006 | Lucas et al. | |
| 7,089,492 B2 | 8/2006 | Anderson | |
| 7,162,526 B2 * | 1/2007 | Dutta et al. | 715/206 |
| 7,493,560 B1 | 2/2009 | Kipnes et al. | |
| 2006/0090138 A1 * | 4/2006 | Wang et al. | 715/760 |
| 2006/0095252 A1 * | 5/2006 | Takagi et al. | 715/513 |
| 2006/0150075 A1 * | 7/2006 | Dietl et al. | 715/501.1 |
| 2006/0200757 A1 | 9/2006 | Stephen et al. | |
| 2006/0288283 A1 | 12/2006 | Schrepp et al. | |
| 2006/0290709 A1 | 12/2006 | Omi et al. | |
| 2008/0134089 A1 | 6/2008 | Adachi et al. | |
| 2008/0208785 A1 | 8/2008 | Trefler et al. | |
| 2008/0313206 A1 | 12/2008 | Kordun et al. | |
| 2009/0300056 A1 | 12/2009 | Fu et al. | |
| 2009/0300163 A1 | 12/2009 | Holm et al. | |
| 2010/0070872 A1 * | 3/2010 | Trujillo | 715/745 |
| 2010/0205523 A1 * | 8/2010 | Lehota et al. | 715/235 |

OTHER PUBLICATIONS

Chen, Yui-Liang and Ho, Yung-Y, The status of using "big Eye" Chinese screen reader on "wretch" blog in Taiwan, ACM International Conference Proceeding Series, v 225, p. 134-135, 2007, International Cross-Disciplinary Conference on Web Accessibility 2007, W4A, May 7, 2007-May 8, 2007 (Abstract Only).

* cited by examiner

METHOD AND APPARATUS FOR DEFINING SCREEN READER FUNCTIONS WITHIN ONLINE ELECTRONIC DOCUMENTS

FIELD OF THE INVENTION

The invention relates generally to computing systems. More specifically, the invention relates to methods and apparatus for defining screen reader functions within online electronic documents.

BACKGROUND

People with visual disabilities are among the many who venture onto the Internet to traverse the World Wide Web ("the web"). The visually impaired, however, would miss much of the richness of the Internet, if not for screen reader software programs. In general, a screen reader makes personal computers accessible to blind or visually impaired users by using a speech synthesizer and the computer's sound card to read aloud the information appearing upon the computer's monitor screen. Accordingly, when a web page appears on the user's screen, the screen reader program reads aloud the HTML (Hypertext Markup Language) layout and words on the web page.

A relatively recent trend, however, presents new challenges to the traditional screen reader program. The web is moving towards a programmable platform with emerging technologies, such as mashups, lightbox popups, and various other methods to display information to users. Typically, such emerging technologies devise new uses for HTML markup attributes and lead to new HTML standards. Meanwhile, if a conventional screen reader program encounters an undefined or non-standard attribute in a web page, the screen reader program either reads this information to a user, or generates an error report to indicate they have encountered HTML protocol that is non-standard or in error. A problem, however, is that often these presumably non-standard attributes are actually valid attributes being deployed by an emerging technology. Thus, as the use of HTML markup attributes outpaces HTML standards, or as new HTML standards emerge, screen readers must offer new versions to adapt to the changes. Screen readers, however, are simply unable to keep pace with technology.

SUMMARY

In one aspect, the invention features a computer program product for facilitating screen readers of online electronic documents. The computer program product comprises a computer readable storage medium having computer readable program code embodied therewith. The computer readable program code is configured to generate a structured electronic document including markup language code and scripting language code whose execution is triggered by an occurrence of an event associated with execution of the markup language code, to define a mapping of one or more functions of a screen reader software program to one or more functions performed by the scripting language code when the scripting language code is executed in response to the occurrence of the event, and to incorporate the mapping of functions within the structured electronic document.

In another aspect, the invention features a computer program product for enhancing accessibility to online electronic documents for visually impaired persons. The computer program product comprises a computer readable storage medium having computer readable program code embodied therewith. The computer readable program code is configured to parse a structured electronic document including markup language code and scripting language code whose execution is triggered by an occurrence of an event associated with execution of the markup language code. The structured electronic document has defined therein a configuration file that maps one or more accessibility functions to one or more functions performed by the scripting language code; The computer readable program code is also configured to execute a given function of the scripting language code in response to the occurrence of the event and to perform each accessibility function mapped by the configuration file to the given function in response to the execution of the given function of the scripting language code.

In another aspect, the invention features a computing system for facilitating screen readers of online electronic documents. A processor runs computer readable program code configured to generate a structured electronic document including markup language code and scripting language code whose execution is triggered by an occurrence of an event associated with execution of the markup language code. Memory stores a configuration file that maps of one or more functions of a screen reader software program to one or more functions performed by the scripting language code when the scripting language code is executed in response to the occurrence of the event. The processor executes computer readable program code to incorporate the configuration file within structured electronic document.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Configuration files, as described herein, enable accessibility tools, such as screen readers, to keep apace of emerging and perpetually evolving web presentations and of the non-standard markup language attributes and tags that enable them. In general, conventional screen readers cannot adequately process non-standard attributes and tags in web pages, not being configured to recognize or know how to read aloud their associated content.

In brief overview, a web developer who builds advanced web presentation functionality into a web page also includes a configuration file within the web page. The configuration file aids screen readers by providing definitions for non-standard attributes and tags that produce the web presentation functionality and descriptions of their corresponding visual behavior. Upon encountering a non-standard attribute or tag in a web page, a screen reader that is configured to process configuration files turns to these descriptions in order to determine what, if any, action to take and what information to deliver audibly. The configuration file can also define which other screen reader functions (in addition to reading) are to be invoked in response to the navigation of the user through the web page. Thus, screen readers configured to process configuration files automatically adapt to new web presentation features as they emerge, provided the creators of such web presentation features include an appropriate configuration file, with its definitions of non-standard attributes and their corresponding treatment, within the web page.

For example, consider a popup menu coded in a web page with the following:

```
<div gg="http://www.igoogle.com/" nv="http://www.netvibes.com"
yh="http://www.yahoo.com" pf="http://www.pageflake.com"></div>
```

The attributes (gg, nv, yh, and pf) defined by this <div> tag are non-standard attributes. When a mouseover occurs on an associated HTML image link, scripting language code can read this <div> tag and presents its attributes in a popup menu. Without a configuration file in the web page to describe the non-standard attributes of the popup menu, however, a screen reader cannot recognize or know how to process them. Consequently, a visually impaired user would not appreciate the popup menu, and would need a new release of a screen reader that knows how to interact with these non-standard attributes.

On the other hand, a configuration file embedded in the web page by the web page developer can define these non-standard attributes for the screen reader and direct the screen reader regarding what to do and what to say aloud. For example, based on the definitions and descriptions in the accompanying configuration file, the screen reader can inform the user audibly that a popup menu has appeared and presents four menu items, and then prompt the user audibly to select the desired menu item using the Tab key.

Figure 1:
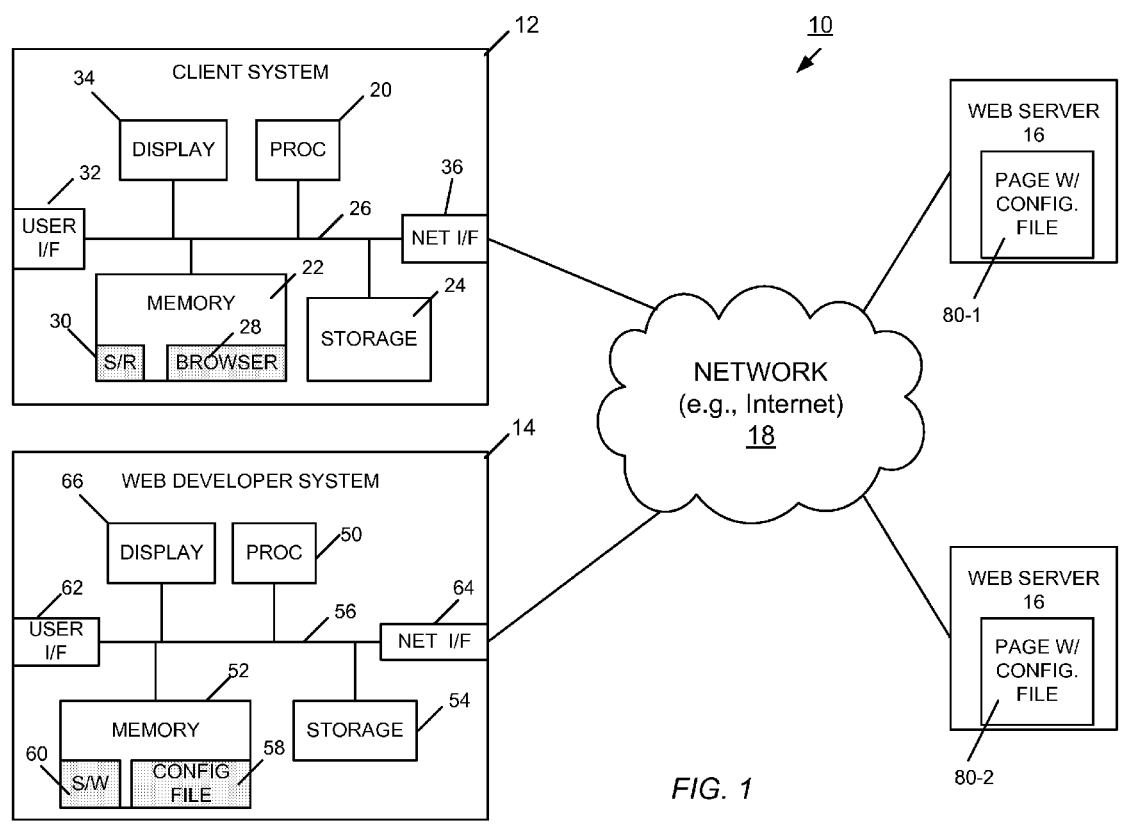
FIG. 1 is a block diagram of an embodiment of a network environment in which the principles of the invention may be practiced.

FIG. 1 shows an embodiment of a network environment 10, including a client computing system 12 and a web developer computing system 14 in communication with a plurality of web servers 16 over a network 18. Examples of the network 18 include, but are not limited to, local-area networks (LAN), metro-area networks (MAN), and wide-area networks (WAN), such as the Internet and World Wide Web.

Client computing system 12 (hereafter, client) includes a processor 20 in communication with memory 22 and disk storage 24 over a communication bus 26. The communication bus 26 also connects the processor 20 to various other components of the client 12, including a user interface 32, a display (e.g., a video monitor) 34, and a network interface 36. Over one or more links (wire or wireless), the user interface 32 is in communication with one or more user-input devices (e.g., a keyboard, a mouse, trackball, touchpad, touch-screen, microphone, joystick), by which a user can enter information and commands into the client 12.

The memory 22 includes non-volatile computer storage media, such as read-only memory (ROM), and volatile computer storage media, such as random-access memory (RAM). Stored in the ROM may be a basic input/output system (BIOS), which contains program code for controlling basic operations of the client 12, including start-up of the client and initialization of hardware. Stored within the RAM are files of program code and data. Program code includes, but is not limited to, application programs, program modules, plug-ins, and an operating system. The non-volatile storage 24 may be removable or non-removable storage media, examples of which include, but are not limited to, hard disks, USB memory sticks, optical disks such as CD ROMs, magnetic diskettes, and flash memory cards.

Application programs on the client 12 include, but are not limited to, an Internet browser 28 for accessing and downloading structured electronic documents written in a markup language, for example, HTML, from web servers 16 over the network 18. Examples of Internet browsers for downloading online electronic documents (also referred to herein as web pages) include, but are not limited to, Microsoft® Internet Explorer™, Google® Chrome™, and Mozilla® Firefox®.

Another application program on the client 12 is a screen reader 30, which works in cooperation with the Internet browser 28 to read aloud content displayed by downloaded web pages. An example of such a screen reader is JAWS®, produced by Freeware Scientific, Inc. of St. Petersburg, Fl. In addition, the screen reader 30 is configured to detect and process configuration files that are included within a downloaded web page, in order to apply accessibility functionality to non-standardized attributes and HTML tags within the web page.

The Internet browser 28 is enabled to execute code written in a scripting language, such as JavaScript, VBScript, Jscript, and XUL (XML User Interface Language). Code written in a scripting language can perform tasks not otherwise possible using HTML code alone. The particular scripting language used in a web page may limit the particular Internet browser that is able to execute that scripting language code. For instance, presently VBScript works only in the Microsoft® Internet Explorer™. In contrast, JavaScript works with many popular browser platforms, such as Microsoft® Internet Explorer™, Google® Chrome™, and Mozilla® Firefox®.

The web developer computing system (hereafter, web developer) 14 includes a processor 50 in communication with memory 52 and storage 54 (examples of which are previously described) over a communication bus 56. In addition, the communication bus 56 connects the processor 50 to other components of the web developer 14, including a user interface 62, a network interface 64, and a display 66.

The memory 52 includes ROM for controlling basic operations of the web developer 14 and RAM for storing files of program code and data. Among the files stored in the memory 52 is a configuration file 58, which is available for embedding in web pages to give screen reader applications to ability to read specified non-standard attributes and tags. In general, the configuration file 58 defines the functions that a screen reader is to invoke when the user navigates through a web page containing this configuration file 58 and encounters non-standard attributes or HTML tags defined by this configuration file 58. Although only one configuration file 58 is shown, the memory 52 can store a plurality of configuration files, with each configuration file being tailored to instruct an accessibility tool regarding how to process certain non-standard attributes or HTML tags. A web developer can include more than one configuration file within a given web page. In one embodiment, the configuration file 58 is an XML (Extensible Markup Language) file.

The program code stored in the memory 52 includes, but is not limited to, application programs, program modules, plug-ins, and an operating system. Application programs on the web developer 14 include, but are not limited to, development environment software for developing web applications and web sites. For example, the development environment can be implemented using the Dojo Toolkit provided by the Dojo Foundation. In general, the Dojo Toolkit provides a JavaScript library of JavaScript controls used in the development of JavaScript applications. The configuration file 58 can be incorporated as a widget in the Dojo widget library, and be used to construct web pages, in a manner known to those skilled in the art.

Example implementations of the client 12 and the web developer 14 include, but are not limited to, a personal computer (PC), Macintosh® computer, MacBook® computer, a workstation, a kiosk, laptop computer, server system, hand-held device, such as a personal digital assistant (PDA), a mobile or cellular phone, and network terminal. Examples of operating systems that can run on the client 12 and web developer 14 include, but are not limited to, Windows XP®, Vista®, Windows 7, Linux, and Macintosh® OS). Although each is shown as a single bus, the communication busses 26, 56 can comprise multiple separate busses, which may be of different types. Example implementations of the communication busses 26, 56 include, but are not limited to, a Peripheral Component Interconnect (PCI) bus, an Industry Standard Architecture (ISA) bus, an Enhanced Industry Standard Architecture (EISA) bus, and a Video Electronics Standards Association (VESA) bus.

The web servers 16, in general, are computer systems connected to the network 18 that maintain web sites (i.e., collections of related web pages). The web servers 16 deliver web pages 80-1, 80-2 (generally, 80) over the network 18 to the client browsers using HTTP (HyperText Transport Protocol). The web pages 80 residing at the web servers include one or more configuration files. To download a web page 80 from a web server 16, the network interface 36 of the client 12 can connect to the network 18 through one of a variety of connections including, but not limited to, standard telephone lines, digital subscriber line, LAN or WAN links (e.g., T1, T3), broadband connections (Frame Relay, ATM), and wireless connections (e.g., 802.11(a), 802.11(b), 802.11(g)). To upload a web page 80 to a web server, the network interface 64 of the web developer 14 can also connect to the network 18 through any one of such example connections.

Figure 2:
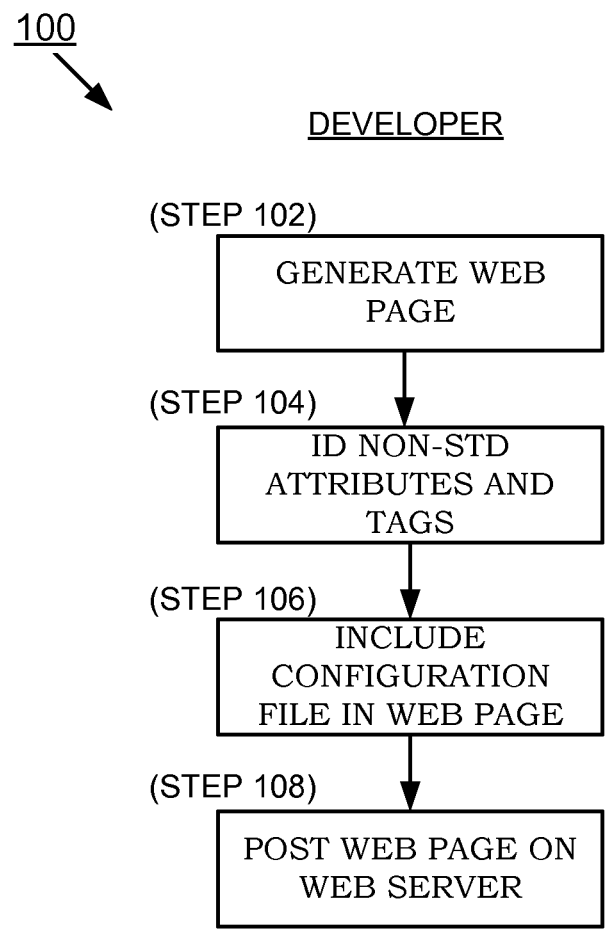
FIG. 2 is a flow diagram of an embodiment of a process for facilitating screen readers of downloaded structured electronic documents to read aloud non-standard markup language attributes in an online electronic document.

FIG. 2 shows an embodiment of a process 100 for generating a web page configured to work with accessibility tools in accordance with the principles of the invention. At step 102, a web developer generates an HTML web page coded to produce a desired presentation when displayed on the client display screen. The web page's HTML code can associate event attributes with HTML elements and include event handlers, written in a scripting language, for handling triggered events. Examples of events include, but are not limited to, onmouseover, onclick, and onkeypress. Preferably, the scripting language is JavaScript because of its cross-browser platform capabilities. Execution of the scripting language code can achieve a variety of web presentations, for example, as popups, mashups, and lightboxes.

For example, the following HTML code can be used to display a popup when a user moves the mouse cursor over a certain image (i.e., a mouseover event):

```
<img id="event1" src="image.jpg" >
```

When the web page loads on the client's screen, the image associated with image.jpg appears. The HTML statement associates a unique id with the image object (here, "event1").

Consider, for example, the mouseover event is assigned to a <div> element for displaying a popup window, as follows:

```
<div id="popup-element">blah, blah, blah</div>
```

This <div> tag element resides in the HTML body of the web page, and remains hidden until the user moves the mouse cursor over the image id="event1". At that moment, the scripting language code that is handling the mouseover event makes the <div> element with id=popup-element have a high-z index, and sets the style="display:block" so that the HTML appears to be a popup on top of the displayed web page.

Without the incorporation of a configuration file in the web page, a screen reader does not know how to read this popup to the user because the screen reader does not know upon which element to focus. For instance, the popup can appear anywhere on top the web page (e.g., far from the present location of the cursor). To assist the screen reader, the web developer identifies (step 104) any non-standard attributes or tags within the HTML code of the web page and, using a configuration file, includes (step 106) a description of what functions the screen reader should perform when the event triggers execution the non-standard attributes or tags within the HTML code. This description within the configuration file maps one or more functions of the screen reader to one or more functions of the scripting language code that handles the event that triggers the execution of such non-standard attributes or tags.

The following pseudo-code provides an example of a configuration file that the web developer can include in the web page, at the time of constructing the web page, in order to tell the screen reader what to do when the above-described popup appears on the display:

```
<element:define id="event1"> <! Statement 1 ->
<function @jaws="focus:read"> <! Statement 2 - JAWS is the
accessibility application; focus and read are functions that can be invoked
in the accessibility application ->
<focus length="10s">popup-element</focus> <! Statement 3 defines
the focus attributes, here, focus on the popup id="popup-element" for 10
seconds -->
<read>@text</read> <!-- Statement 4 defines what the screen reader
reads - it will read @text, which is the text within the html tags that are at
id="popup-element" -->
</function>
</element>
```

Statement 1 defines the element "event1". The name of the element shares the same name as the image id="event1", and thereby links the mouseover event with this configuration file.

Statement 2 identifies JAWS as the accessibility application for interpreting the defined element "event1", and the two JAWS functions that can be invoked, focus and read. Presumably, the JAWS application program has been given the capability of processing configuration files.

Statement 3 maps the focus attribute in the JAWS accessibility tool to the popup id="popup-element", which is displayed in response to the occurrence of the mouseover event. In this example, JAWS is directed to maintain focus on the popup id="popup-element" for 10 seconds.

Statement 4 maps the read function of JAWS to the content to be read aloud (such content should be related to the popup displayed as a result of executing the scripting language code). Here, an indirect reference, signified by the @ symbol, is made to the particular text to be read aloud (@text). This directs the browser to obtain the text to be read aloud from the <div> element associated with event, which, in this example is "blah, blah, blah." Alternatively, the text to be read aloud can be expressly included in Statement 4, such as <read>blah, blah, blah</read>. In addition, instead of a direct reference, an indirect reference can be used in Statement 3 to point to the particular id (i.e., @special-effect, instead of popup-element). The web developer can then post (step 108) the web page, with the configuration file defined therein, on a web server in the network.

The configuration file for id=event1 is but one example of mapping of screen reader functions to those user functions (e.g., new popup window, display text) implemented by the scripting language in a web page. Other mappings of functions are possible, including mapping multiple screen reader functions to a single user function and mapping a single screen reader function to multiple user functions.

Further, although described herein with reference to a popup element, the principles of the invention extend to other kinds of graphical user interface objects that may appear on top of a displayed web page, for example, in the form of a box, a bubble, a balloon, or a window. Examples of such graphical user objects include, but are not limited to, tooltips, balloon help, screen tips, alert dialog boxes, and drop-down lists.

Figure 3:
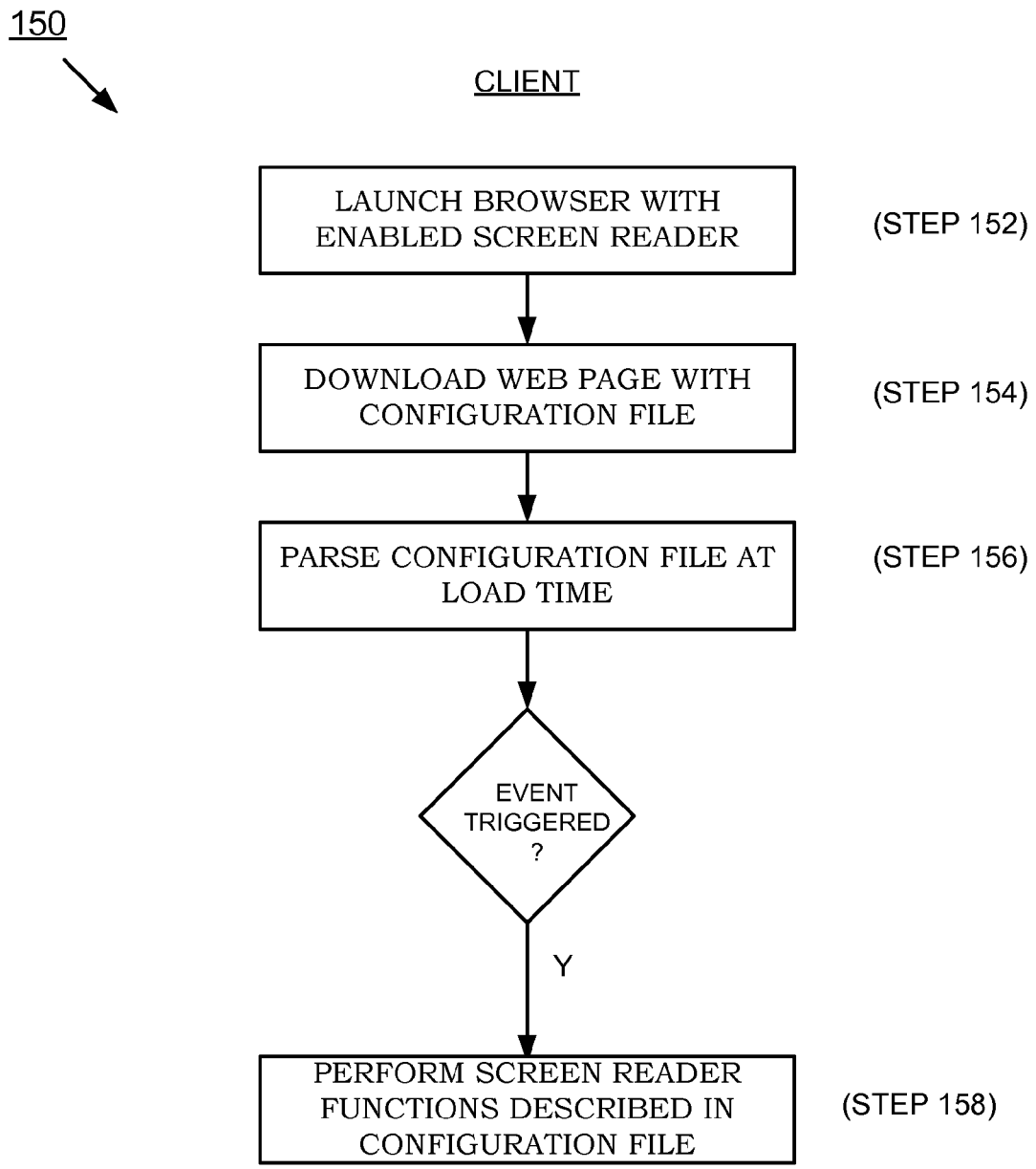
FIG. 3 is a flow diagram of an embodiment of a process for handling a downloaded online electronic document.

FIG. 3 shows an embodiment of a process 150 for rendering a web page with a screen reader in accordance with the principles of the invention. At step 152, a user launches the Internet browser with the screen reader enabled to parse through and read aloud content in downloaded web pages. The user accesses a web server hosting a web site, and downloads (step 154) a web page containing a configuration file. The screen reader parses (step 156) the configuration file at load time. The contents of the configuration file remain unexecuted until the navigation of the user on the web page triggers the event associated with the configuration file. The screen reader then performs (step 158) the functions defined within the configuration file, including reading aloud information directly or indirectly referenced by the configuration file.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions, While the invention has been shown and described with reference to specific preferred embodiments, it should be understood by those skilled in the art that various changes in form and detail may be made therein without departing from the spirit and scope of the invention as defined by the following claims.

What is claimed is:

1. A computer program product for facilitating screen readers of online electronic documents, the computer program product comprising:
    a computer readable storage medium having computer readable program code embodied therewith, the computer readable program code comprising:
    computer readable program code configured to generate a structured electronic document including markup language code and scripting language code whose execution is triggered by an occurrence of an event associated with execution of the markup language code, the execution of the scripting language code producing a web presentation unrecognized by a screen reader software program;
    computer readable program code configured to define a mapping of one or more functions of the screen reader software program to one or more functions performed by the scripting language code that produces the unrecognized web presentation when the scripting language code is executed in response to the occurrence of the event; and
    computer readable program code configured to incorporate the mapping of functions within the structured electronic document when the structured electronic document is initially generated, before the structured electronic document is posted on a web server and made available for subsequent downloading and display,
    wherein the mapping of functions specifies text obtained from the unrecognized web presentation to be read aloud by the screen reader.

2. The computer program product of claim 1, wherein the mapping of functions points to text in the markup language code to be read aloud by the screen reader software program.

3. The computer program product of claim 1, wherein the mapping of functions maps a focus function of the screen reader software program to an HTML (HyperText Markup Language) element produced by execution of the scripting language code.

4. The computer program product of claim 3, wherein the HTML element is an object of a graphical user interface that appears on top of the structured electronic document.

5. The computer program product of claim 1, wherein the mapping of functions is stored in a separate configuration file.

6. The computer program product of claim 5, wherein the configuration file is an XML (Extensible Markup Language) file.

7. A computer program product for enhancing accessibility to online electronic documents for visually impaired persons, the computer program product comprising:
    a computer readable storage medium having computer readable program code embodied therewith, the computer readable program code comprising:
    computer readable program code configured to parse a structured electronic document including markup language code and scripting language code whose execution is triggered by an occurrence of an event associated with execution of the markup language code, the execution of the scripting language code producing a web presentation unrecognized by a screen reader, the structured electronic document having an embedded configuration file with which the structured electronic document is downloaded, the configuration file being embedded in the structured electronic document when the structured electronic document is initially generated, before the structured electronic document is posted on a web server and made available for subsequent downloading and display, the configuration file mapping one or more accessibility functions to one or more functions performed by the scripting language code that produces the unrecognized web presentation;
    computer readable program code configured to execute a given function of the scripting language code in response to the occurrence of the event; and
    computer readable program code configured to perform each accessibility function mapped by the configuration file to the given function in response to the execution of the given function of the scripting language code,
    wherein the configuration file specifies text obtained from the unrecognized web presentation to be read aloud.

8. The computer program product of claim 7, wherein the configuration file points to text in the markup language code to be read aloud.

9. The computer program product of claim 7, wherein the configuration file maps a focus accessibility function to an HTML element produced by the execution of the given function of the scripting language code.

10. The computer program product of claim 9, wherein the HTML element is an object of a graphical user interface that appears on top of the structured electronic document.

11. The computer program product of claim 7, the configuration file is an XML file.

12. The computer program product of claim 7, wherein the configuration file is a separate file parsed at load time of the structured electronic document.

13. A computing system for facilitating screen readers of online electronic documents, comprising:
    a processor running computer readable program code configured to generate a structured electronic document including markup language code and scripting language code whose execution is triggered by an occurrence of an event associated with execution of the markup language code, the execution of the scripting language code producing a web presentation unrecognized by a screen reader software program; and
    memory storing a configuration file that maps of one or more functions of the screen reader software program to one or more functions performed by the scripting language code that produces the unrecognized web presentation when the scripting language code is executed in response to the occurrence of the event, wherein the processor executes computer readable program code to incorporate the configuration file within the structured electronic document when the structured electronic document is initially generated, before the structured electronic document is posted on a web server and made available for subsequent downloading and display, and wherein the configuration file points to text obtained from the unrecognized web presentation in the markup language code to be read aloud by the screen reader software program.

14. The computing system of claim 13, wherein the configuration file maps a focus function of the screen reader software program to an HTML element produced in response to execution of the scripting language code.

15. The computing system of claim 13, wherein the configuration file is an XML file.

16. The computer program product of claim 7, wherein the configuration file provides a definition for each non-standard attribute and tag in the structured electronic document and a description of how to process each such non-standard attribute and tag.

17. The computing system of claim 13, wherein the configuration file provides a definition for each non-standard attribute and tag in the structured electronic document and a description of how to process each such non-standard attribute and tag.

* * * * *